United States Patent [19]

Kodama

[11] Patent Number: 4,663,681

[45] Date of Patent: May 5, 1987

[54] REEL BASE DRIVING MECHANISM

[75] Inventor: Yoshimi Kodama, Kobe, Japan

[73] Assignee: Sanyo Electric Co., Ltd., Moriguchi, Japan

[21] Appl. No.: 688,942

[22] Filed: Jan. 4, 1985

[30] Foreign Application Priority Data

Jan. 9, 1984 [JP] Japan ............................. 59-1423[U]
Mar. 19, 1984 [JP] Japan ........................... 59-39127[U]

[51] Int. Cl.$^4$ ............................................. G11B 15/00
[52] U.S. Cl. .................................. 360/96.3; 360/85; 242/200
[58] Field of Search .................... 360/96.3, 96.4, 85, 360/95; 242/198–200, 197

[56] References Cited

U.S. PATENT DOCUMENTS 4,399,475 8/1983 Shimomae ........................... 360/96.3
4,419,702 12/1983 Tanaka ................................ 360/96.4

*Primary Examiner*—A. J. Heinz
*Attorney, Agent, or Firm*—Armstrong, Nikaido, Marmelstein & Kubovcik

[57] ABSTRACT

A reel base driving mechanism for use in a vertical setting type magnetic recording and reproducing apparatus, including an idler in selective and pivotal engagement with a supply reel base and a takeup reel base, an idler lever for supporting the idler, a friction member provided between the idler lever and the idler and a drive member for driving the idler. The idler lever is provided with a weight adjusting member.

15 Claims, 11 Drawing Figures

REEL BASE DRIVING MECHANISM

BACKGROUND OF THE INVENTION

The present invention generally relates to a magnetic recording and reproducing apparatus such as a video tape recorder or the like and more particularly, to a reel base driving mechanism for use in the magnetic recording and reproducing apparatus.

Figure 1:
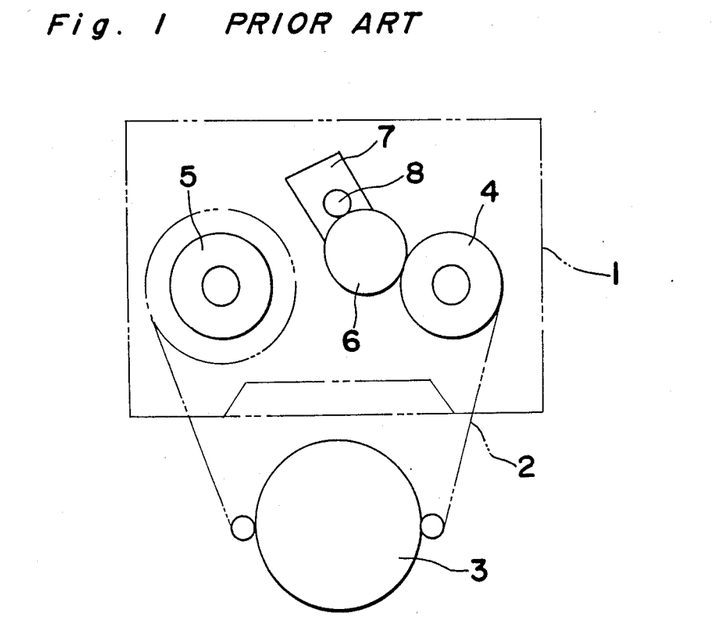
FIG. 1 is a schematic view of a prior art reel base driving mechanism of a video tape recorder (already referred to)

A reel base driving mechanism for use in a magnetic recording and reproducing apparatus is known from, for example, Japanese Utility Model Publication No. 31290/1973 (Jikkosho 48-31290) in which an idler is pivotally provided. One example of application of the known reel base driving mechanism to a video tape recorder is shown in FIG. 1 in which a tape cassette 1, a guide cylinder 3, a supply reel base 4 for rotating a tape supply reel, a takeup reel base 5 for rotating a tape takeup reel, an idler 6 and an idler lever 7 for supporting the idler 6 are provided such that a video tape 2 drawn out of the cassette 1 is wound over a predetermined angle around the guide cylinder 3. The idler 6 is selectively and pivotally brought into rolling contact, through rotation of a motor pulley 8 in pressing contact with the idler 6, with the supply reel base 4 and the takeup reel base 5 so as to be pivoted together with the idler lever 7 about the motor pulley 8. Meanwhile, a friction member (not shown) made of felt, plastic magnet or the like is provided between the idler 6 and the idler lever 7.

Figure 2:
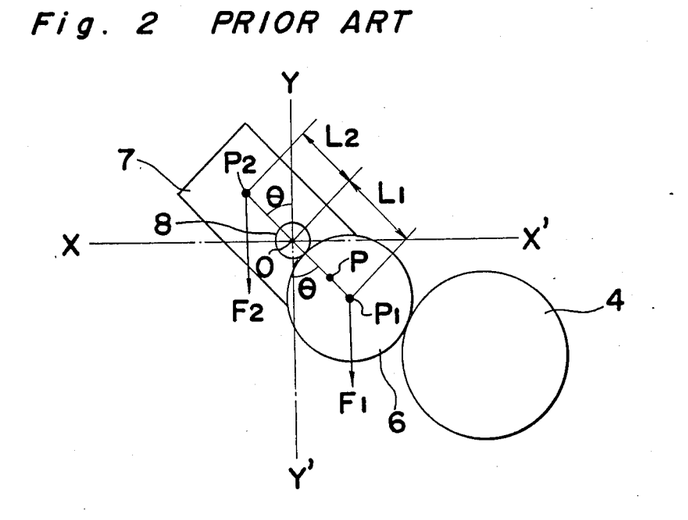
FIG. 2 is a fragmentary schematic view of the prior art reel base driving mechanism of FIG. 1 (already referred to)

On the other hand, in response to recent diversified development of the video tape recorders, there have been proposed vertical setting type video tape recorders such as portable video tape recorders, vertical type video tape recorders, etc., each provided with a mechanism chassis having a component mounting face oriented vertically, in addition to horizontal setting type video tape recorders such as conventional fixed type video tape recorders, each provided with a mechanism chassis having a component mounting face oriented horizontally. In the case where the reel base driving mechanism of FIG. 1 is employed in the vertical setting type video tape recorders, it is usually so arranged that the cassette 1 is loaded into the video tape recorders such that a tape outlet side of the cassette 1 is oriented downwardly. As shown in FIG. 2, supposing that centers of gravity of the idler 6 and the idler lever 7 are P1 and P2, respectively, gravitational forces applied to the centers P1 and P2 of gravity are F1 and F2, respectively, lengths between a pivotal center O of the idler lever 7 and the center P1 of gravity and between the pivotal center O and the center P2 of gravity are L1 and L2, respectively and an angle formed by an ordinate Y-Y' and a straight line connecting, via the pivotal center O, the centers P1 and P2 of gravity is $\theta$, a turning moment M1 of the idler 6 and a turning moment M2 of the idler lever 7 are given by:

$$M1 = F1 \ L1 \sin \theta$$

$$M2 = F2 \ L2 \sin \theta$$

When the idler 6 is simply placed on the idler lever 7, the gravitational force F1 is apt to be larger than the gravitational force F2 and thus, the turning moment M1 becomes larger than the turning moment M2. Namely, since a center P of gravity of combination of the idler lever 7 and the idler 6 is disposed on a line O-P1 below an abscissa X-X', a clockwise turning moment is generated so as to reduce a pressing contact force applied from the idler 6 to the supply reel base 4. Since this pressing contact force is obtained by a frictional force of the friction member disposed between the idler lever 7 and the idler 6, the frictional force of the friction member is required to be increased in order to prevent reduction of the above described pressing contact force. Thus, the known vertical setting type video tape recorders have such inconveniences that since a load of a drive motor, i.e., a reel motor increases when the frictional force of the friction member is enlarged, power consumption of the reel motor increases and the reel motor cannot be made compact in size.

SUMMARY OF THE INVENTION

Accordingly, an essential object of the present invention is to provide an improved reel base driving mechanism for use in a vertical setting type video tape recorder, in which when an idler is selectively and pivotally brought into pressing contact with a supply reel base and a takeup reel base at a pressing contact force, a turning moment oriented in a direction for increasing the pressing contact force is positively generated so as to increase the pressing contact force such that a compact reel motor of small power consumption can be obtained, thereby making the video tape recorder compact in size, with substantial elimination of the disadvantages inherent in conventional reel base driving mechanisms of this kind.

In accomplishing these and other objects according to one preferred embodiment of the present invention, there is provided an improved reel base driving mechanism for use in a magnetic recording and reproducing apparatus including a chassis having said reel base driving mechanism mounted thereon such that said chassis is oriented vertically, said reel base driving mechanism including a supply reel base, a takeup reel base, an idler which is selectively and pivotally brought into engagement with said supply reel base and said takeup reel base, an idler lever for supporting said idler, a friction member which is provided between said idler lever and said idler, and a drive member for driving said idler, the improvement comprising: said idler lever having a pivotal center and being provided, at one side of said idler lever opposite to said idler with respect to said pivotal center, with a weight adjusting member.

In accordance with the present invention, since the pressing contact force between the idler and one of the supply reel base and the takeup reel base is increased by the generated turning moment, the compact reel motor of small power consumption can be obtained and thus, the vertical setting type video tape recorder can be made compact in size.

BRIEF DESCRIPTION OF THE DRAWINGS

These and other objects and features of the present invention will become more apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 3:
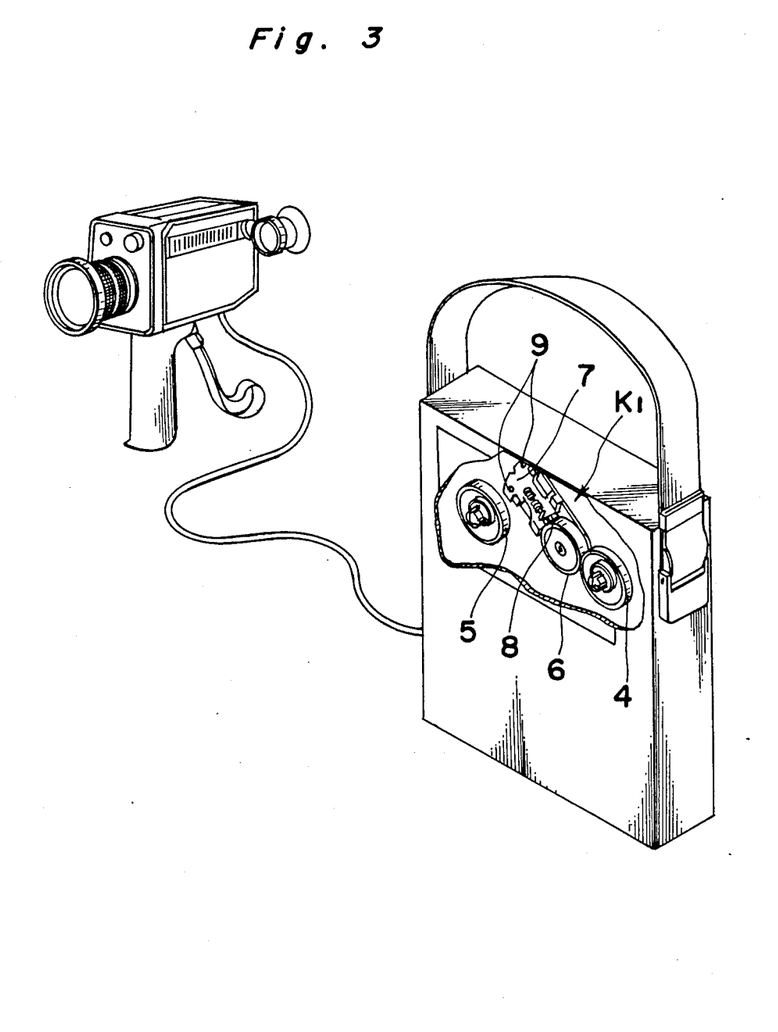
FIG. 3 is a perspective view of a video deck connected with a video camera, in which a reel base driving mechanism according to a first embodiment of the present invention is incorporated.
Figure 4:
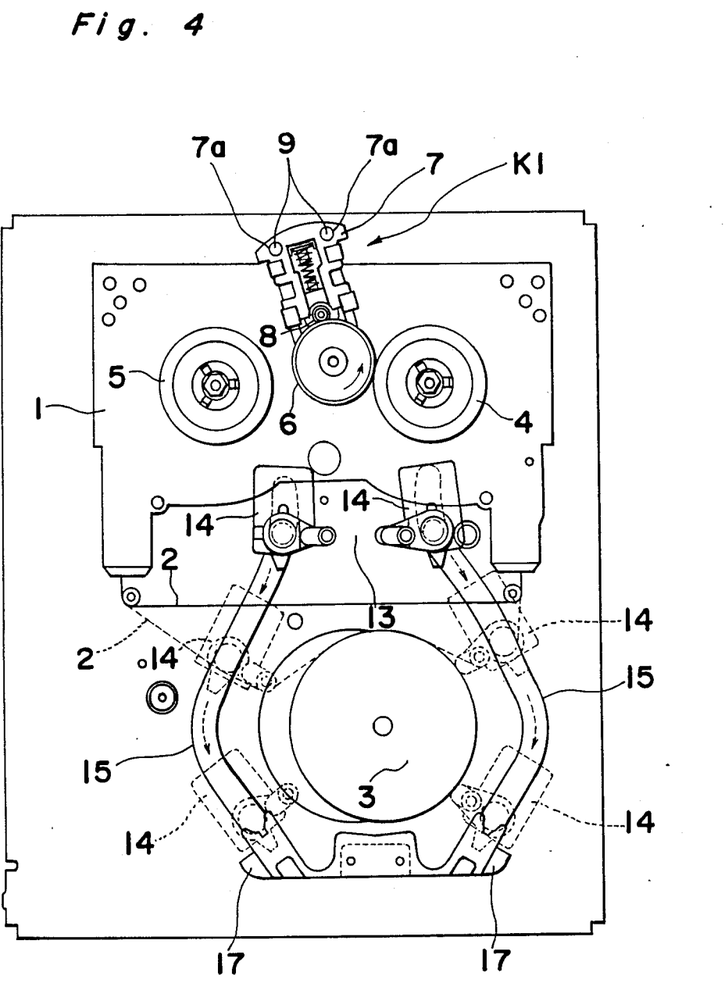
FIG. 4 is a fragmentary front elevational view of the video deck of FIG. 3.

Referring now to the drawings, there is shown in FIGS. 3 and 4, a reel base driving mechanism K1 according to a first embodiment of the present invention, which is incorporated in a portable video tape recorder, i.e., a video deck connected with a video camera. The video camera is used by an operator by vertically hanging the video deck on one of the operator's shoulders.

As shown in FIG. 4, the reel base driving mechanism K1 includes a supply reel base 4, a takeup reel base 5, an idler lever 7 made of resin, an idler 6 mounted on the idler lever 7, and a motor pulley 8 in pressing contact with the idler 6. It should be noted that the idler lever 7 is provided, at one end portion thereof, with a pair of weight adjusting members 7a each formed by a rod 9 fitted into the idler lever 7. The rod 9 acting as a weight is made of metal having a specific gravity larger than that of the idler lever 7, such as brass, etc. The video deck includes a guide cylinder 3, a recess 13, a pair of tape guides 14, a pair of guide grooves 15 and a pair of stoppers 17. A tape cassette 1 is loaded into the video deck such that a tape outlet side of the cassette 1 is oriented downwardly as shown. When the tape guides 14 disposed in the recess 13 are, respectively, displaced upwardly in FIG. 4 along the guide grooves 15, a video tape 2 is drawn out of the cassette 1 so as to be wound around the guide cylinder 3 inclined at a predetermined angle. Then, the tape guides 14 are, respectively, blocked by the stoppers 17 through pressing contact of the tape guides 14 with the stoppers 17 and thus, a loading operation of the tape 2 is completed.

Figure 5:
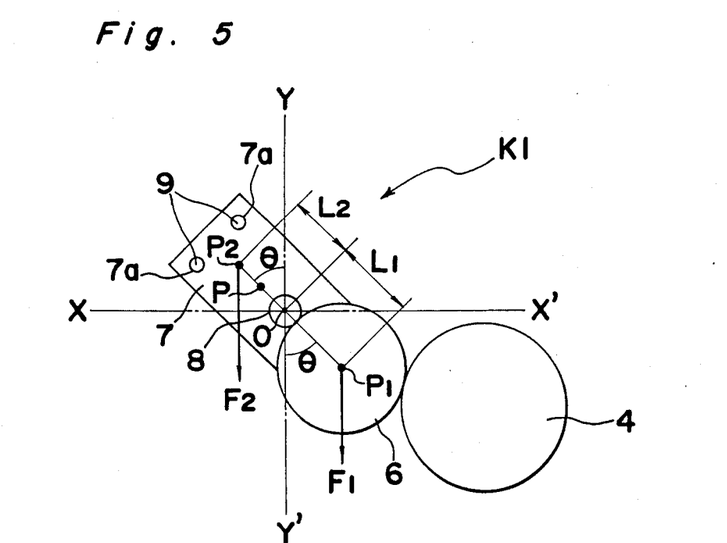
FIG. 5 is a fragmentary schematic view of the reel base driving mechanism of FIG. 3.

Referring to FIG. 5, a turning moment M1 of the idler 6 and a turning moment M2 of the idler lever 7 are expressed by the following equations:

$$M1 = F1\ L1\ \sin\theta$$

$$M2 = F2\ L2\ \sin\theta$$

where:

P1 = center of gravity of idler 6,
P2 = center of gravity of idler lever 7,
F1 = gravitational force applied to center P1 of gravity,
F2 = gravitational force applied to center P2 of gravity,
O = pivotal center of idler lever 7,
L1 = length between pivotal center O and center P1 of gravity,
L2 = length between pivotal center O and center P2 of gravity, and
$\theta$ = angle formed by ordinate Y-Y' and line P1-O-P2.

Since the idler lever 7 is provided with a pair of the weight adjusting members 7a each formed by the rod 9 acting as a weight as described earlier, the turning moment M2 becomes larger than the turning moment M1, so that a center P of gravity of combination of the idler lever 7 and the idler 6 is disposed on a line O-P2 above an abscissa X-X'. Thus, since a counterclockwise turning moment is generated, a pressing contact force applied from the idler 6 to the supply reel base 4 is increased. Although the reel base driving mechanism K1 has been described with respect to the supply reel base 4, the present invention can be also applied to the takeup reel base 5 in the same manner as the supply reel base 4 and therefore, description of the takeup reel base 5 is abbreviated for the sake of brevity.

Figure 6:
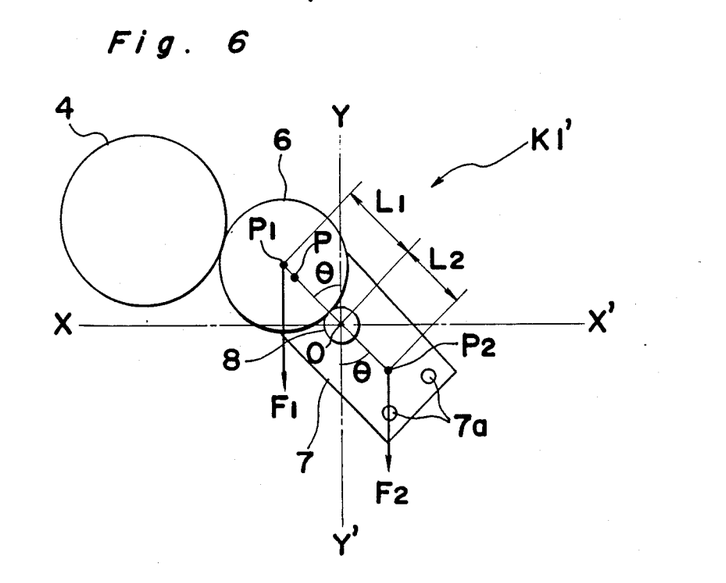
FIG. 6 is a view similar to FIG. 5, particularly showing a modification thereof.

Referring to FIG. 6, there is shown a reel base driving mechanism K1' which is a modification of the reel base driving mechanism K1. The modified reel base driving mechanism K1' is applied to a vertical setting type video tape recorder into which the tape cassette 1 is loaded such that the tape outlet side of the cassette 1 is oriented upwardly. Thus, relative positions of the idler 6 and the supply reel base 4 of the modified reel base driving mechanism K1' are vertically opposite to those of the reel base driving mechanism K1 of FIG. 5. In the modified reel base driving mechanism K1', the weight adjusting members 7a are not formed by the rods 9 but by a pair of apertures. Accordingly, since the turning moment M1 of the idler 6 becomes larger than the turning moment M2 of the idler lever 7, the center P of gravity of combination of the idler lever 7 and the idler 6 is disposed on the line O-P1 above the abscissa X-X'. Thus, since a counterclockwise turning moment is generated, a pressing contact force applied from the idler 6 to the supply reel base 4 is increased. It is to be noted that the modified reel base driving mechanism K1' can be converted into the reel base driving mechanism K1 by simply driving the rods 9 into the apertures, respectively.

Figure 7:
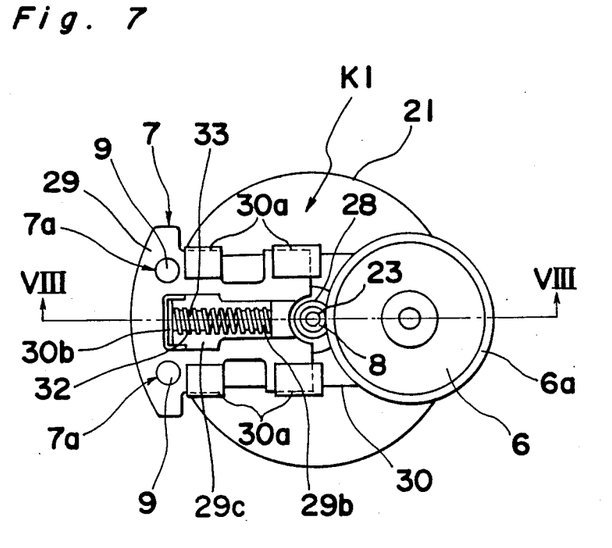
FIG. 7 is a top plan view of the reel base driving mechanism of FIG. 3.
Figure 8:
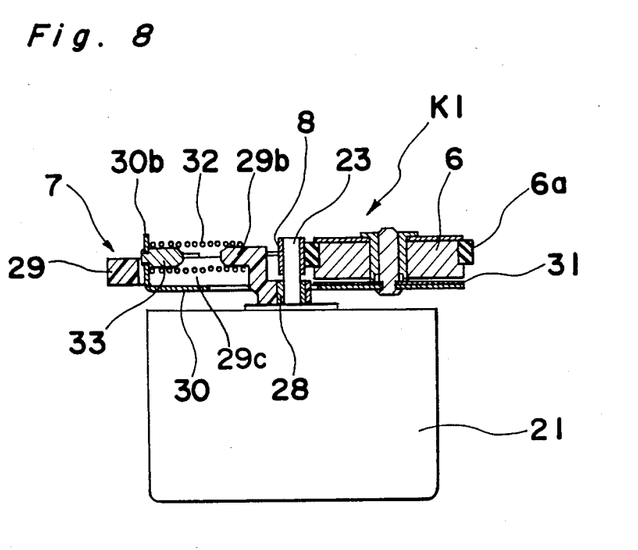
FIG. 8 is a cross-sectional view taken along the line VIII—VIII in FIG. 7.
Figure 9:
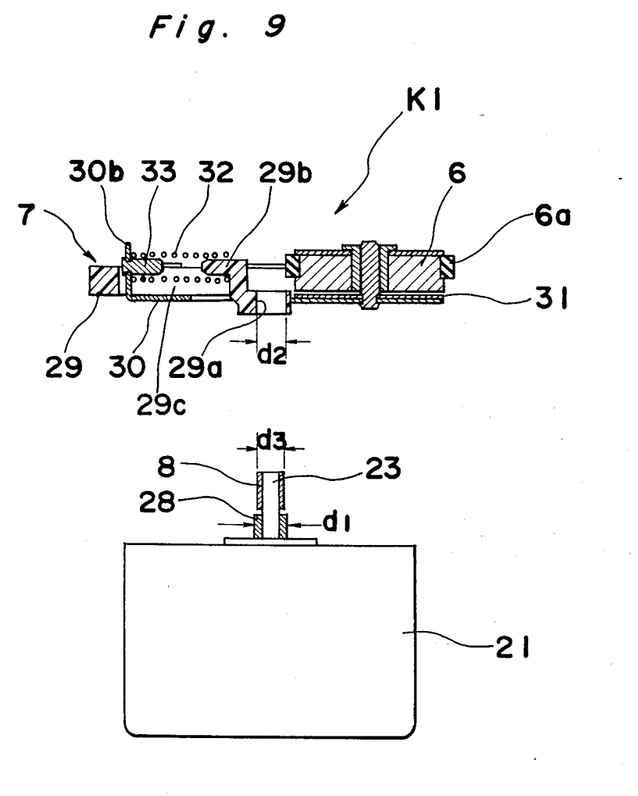
FIG. 9 is an exploded cross-sectional view of the reel base driving mechanism of FIG. 3.

Hereinbelow, the reel base driving mechanism K1 will be described in more detail with reference to FIGS. 7 to 9. The mechanism K1 includes a reel motor 21 having a drive shaft 23. A bushing 28 is loosely fitted around a lower portion of the drive shaft 23. The motor pulley 8 is press fitted around an upper portion of the drive shaft 23 so as to be brought into pressing contact with a rubber band 6a wound around the idler 6. It is to be noted that the idler lever 7 is constituted by a base plate 30 made of metal and a bracket 29 made of resin such that the base plate 30 is slidably mounted on the bracket 29. The bracket 29 of a substantially rectangular shape has a through-hole 29a formed at one end portion thereof, an opening 29c formed at a central portion thereof and a projection 29b extending into the opening 29c. The bracket 29 is further provided, at the other end portion thereof, with a pair of the weight adjusting members 7a each formed by the rod 9 acting as a weight.

Meanwhile, the base plate 30 of a substantially rectangular shape has two pairs of opposite bent pieces 30a bent inwardly from opposite sides thereof and a raised piece 30b formed at one end portion thereof such that the idler 6 is rotatably mounted on the other end portion of the base plate 30 by a friction member 31 made of felt, plastic magnet or the like. The base plate 30 is slidably mounted on the bracket 29 by the bent pieces 30a so as to be slid relative to the bracket 29 such that the raised piece 30b projecting out of the opening 29c confronts the projection 29b. A rod 33 is secured to the raised piece 30b so as to confront the projection 29b. A coiled spring 32 is wound around the projection 29b and the rod 33 so as to urge the idler 6 toward the bracket 29.

An outside diameter d1 of the bushing 28 is approximately equal to an inside diameter d2 of the through-hole 29a, while the inside diameter d2 is larger than an outside diameter d3 of the motor pulley 8. When the mechanism K1 of the above described construction is assembled, the bushing 28 is initially loosely fitted around the drive shaft 23 of the reel motor 21. Subsequently, the motor pulley 8 is press fitted around the drive shaft 23 so as to be disposed above the bushing 28. Then, after the base plate 30 has been slidably mounted on the bracket 29 by the bent pieces 30a and the coiled spring 32, the drive shaft 23 of the reel motor 21 is passed through the through-hole 29a of the bracket 29 until the bushing 28 is fitted into the through-hole 29a such that the motor pulley 8 projecting out of the through-hole 29a is brought into pressing contact with the idler 6, so that the idler lever 7 having the idler 6 rotatably mounted thereon is rotatably mounted on the drive shaft 23, whereby assembly of the mechanism K1 is completed. Thereafter, in the case where the idler lever 7 is removed from the drive shaft 23 of the reel motor 21 for service or repair of the mechanism K1, it is only necessary to withdraw the bracket 29 from the bushing 28. At this time, since it is so arranged that the inside diameter d2 of the through-hole 29a is larger than the outside diameter d3 of the motor pulley 8 as described above, the idler lever 7 can be withdrawn from the drive shaft 23 smoothly without the necessity for removing the motor pulley 8.

Figure 10:
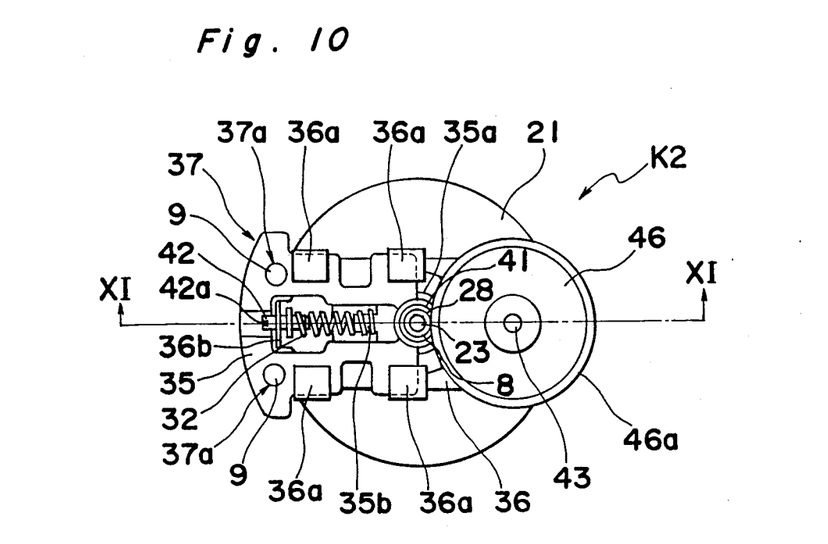
FIG. 10 is a view similar to FIG. 7, particularly showing a reel base driving mechanism according to a second embodiment of the present invention.
Figure 11:
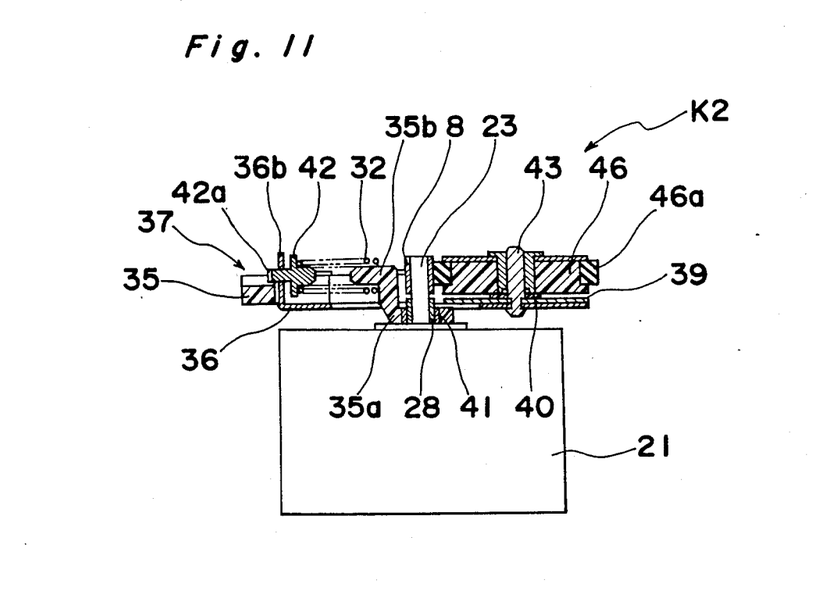
FIG. 11 is a cross-sectional view taken along the line XI—XI in FIG. 10.

Referring to FIGS. 10 and 11, there is shown a reel base driving mechanism K2 according to a second embodiment of the present invention. The mechanism K2 includes an idler lever 37 which is constituted by a bracket 35 made of resin and a base plate 36 made of metal. In the mechanism K2, the bushing 28 made of oilless metal is loosely fitted around the lower portion of the drive shaft 23 of the reel motor 21, while the motor pulley 8 made of brass is press fitted around the upper portion of the drive shaft 23. The bracket 35 is formed with a bearing portion 35a and a projection 35b. A ring 41 made of brass is press fitted into the bearing portion 35a in order to reinforce the bearing portion 35a. Meanwhile, the base plate 36 is formed with two pairs of opposite bent pieces 36a, a raised piece 36b and a pair of weight adjusting members 37a, each formed by the rod 9 acting as a weight in the same manner as in the mechanism K1. The base plate 36 is slidably mounted on the bracket 35 and a pin 43 is secured to one end portion of the base plate 36 such that an idler 46 made of plastic magnet is rotatably mounted on the pin 43. The idler 46, having a rubber band 46a wound therearound, is at all times urged towards an iron plate 39 attached to the base plate 36. A washer 40, made of nylon, is provided between the idler 46 and the iron plate 39 so as to reduce a frictional force produced therebetween. A flanged screw rod 42, formed with a slot for receiving a tip of a screwdriver, is threadedly engaged with an internal thread portion of the raised piece 36b such that the coiled spring 32 extends between the projection 35b and the screw rod 42. The idler 46 is at all times urged towards the bracket 35 by the coiled spring 32. By the above described arrangement of the mechanism K2, since the screw rod 42 is threadedly engaged with the internal thread portion of the raised piece 36b, an urging force of the coiled spring 32 can be adjusted by screwing the screw rod 42 through insertion of the tip of the screwdriver into the slot 42a.

As is clear from the foregoing description, in accordance with the present invention, since the weight adjusting members are provided on the idler lever so as to generate the turning moment of the idler and the idler lever such that the turning moment increases the pressing contact force applied from the idler to the reel base, the pressing contact force can be made sufficiently large even if the compact reel motor is employed, so that the compact reel base driving mechanism of low power consumption can be obtained.

Furthermore, in accordance with the present invention, the reel base driving mechanism can be applied, only through adjustment of the weight adjusting members, not only to the vertical setting type video tape recorder loaded with the cassette having its tape outlet side oriented downwardly, but to the vertical setting type video tape recorder loaded with the cassette having its tape outlet side oriented upwardly.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In a reel base driving mechanism for use in a magnetic recording and reproducing apparatus including a chassis having said reel base driving mechanism mounted thereon such that said chassis is oriented vertically, said reel base driving mechanism including a supply reel base, a take up reel base, an idler which is selectively and pivotally brought into engagement with said supply reel base and said take up reel base to exert a pressing contact force thereon, an idler lever for supporting said idler, a friction member which is provided between said idler lever and said idler, and a drive member for driving said idler, said idler lever having a pivotal center arranged on a substantially horizontal axis such that weight of said idler supported thereon effects a first turning moment on said idler lever affecting said pressing contact force, the improvement comprising:

said idler being provided, at a side of said idler lever opposite to said idler with respect to said pivotal center, with a weight adjusting member that effects a second turning moment on said idler lever affecting said pressing contact force opposite to the effect of said first turning moment, said weight adjusting member being longitudinally positionable on said idler lever so that the combined effects of said first and second turning moments on said idler lever results in a positive pressing contact force.

2. A reel base driving mechanism as claimed in claim 1, wherein said weight adjusting member is formed by at least one weight.

3. A reel base driving mechanism as claimed in claim 1, wherein said weight adjusting member is formed by at least one aperture.

4. A reel base driving mechanism as claimed in claim 3, wherein said weight adjusting member is formed by a pair of apertures.

5. A reel base driving mechanism as claimed in claim 4, wherein said friction member is made of felt.

6. A reel base driving mechanism as claimed in claim 4, wherein said friction member is made of plastic magnet.

7. A reel base driving mechanism as claimed in claim 2, wherein said weight adjusting member is formed by a pair of weights.

8. A reel base driving mechanism as claimed in claim 7, wherein said friction member is made of felt.

9. A reel base driving mechanism as claimed in claim 7, wherein said friction member is made of plastic magnet.

10. A reel base driving mechanism as claimed in claim 1, wherein said friction member is made of felt.

11. A reel base driving mechanism as claimed in claim 1, wherein said friction member is made of plastic magnet.

12. A reel base driving mechanism as claimed in claim 1, wherein said idler lever includes a bracket member rotatably mounted on said drive member and a slide member slidably mounted on said bracket member such that said idler is supported by said slide member.

13. A reel base driving mechanism as claimed in claim 12, further including a spring member for urging said idler towards said bracket member, which is provided between said slide member and said bracket member.

14. A reel base driving mechanism as claimed in claim 13, further including an adjusting means for adjusting an urging force of said spring member.

15. A reel base driving mechanism as claimed in claim 14, wherein said adjusting means includes a threaded rod formed with a slot for receiving a tip of a screwdriver such that said threaded rod is threadedly engaged with said slide member.

* * * * *